UNITED STATES PATENT OFFICE.

GOTTLOB STEINEMANN, OF JOLIET, ILLINOIS.

IMPROVEMENT IN COMPOSITIONS FOR ARTIFICIAL STONE.

Specification forming part of Letters Patent No. 148,772, dated March 17, 1874; application filed February 21, 1874.

*To all whom it may concern:*

Be it known that I, GOTTLOB STEINEMANN, of the city of Joliet, in Will county and State of Illinois, have invented a certain Compound called Artificial Stone, of which the following is a specification:

This invention relates to the use and combination of certain ingredients, combined in the proportions and manner hereinafter described, for the purpose of making artificial stone.

In order to accomplish the result of making said artificial stone, I use and combine the following-named ingredients, to wit: Lamp-black, gum-shellac, cement, gum-arabic, paper-water from a paper-mill, alcohol, brown sand, and white glass sand.

To make the stone No. 2, I mix one-half barrel of the yellow sand to one-half barrel of the white glass sand and one-sixth of a barrel of cement. I then add equal quantities of gum-arabic water and paper-water from a paper-mill to a sufficient amount to make the mixture about the consistency of common mortar, so it will mold easily. I then add to the whole mixture about one quart each of alcohol and gum-shellac. After thoroughly mixing the whole, I then mold in any shape desired, and set it away to dry. The result is the specimen of artificial stone marked No. 2.

In order to color the same dark, as shown in No. 1, I add the lamp-black in such quantity as may be desired. This artificial stone is intended to be used for building material, roofs, floors, &c.

I claim—

The composition consisting of lamp-black, gum-shellac, cement, gum-arabic, paper-water from paper-mill, alcohol, brown sand, and white glass sand, combined in the proportion, and for the purpose of making artificial stone, substantially as set forth.

GOTTLOB STEINEMANN.

Witnesses:
 THOS. H. HUTCHINS,
 LEWIS K. STEVENS.